US008027530B2

(12) United States Patent
Relard et al.

(10) Patent No.: US 8,027,530 B2

(45) Date of Patent: Sep. 27, 2011

(54) APPARATUS AND METHOD FOR OPTICALLY SURVEYING AND/OR EXAMINING A WELDING COMPONENTRY

(75) Inventors: Hermann Relard, Delbrück (DE); Rainer Lübbers, Paderborn (DE); Cordt Erfling, Paderborn (DE)

(73) Assignee: Benteler Automobiltechnik GmbH, Paderborn (DE)

(*) Notice: Subject to any disclaimer, the term of this patent is extended or adjusted under 35 U.S.C. 154(b) by 947 days.

(21) Appl. No.: 11/539,021

(22) Filed: Oct. 5, 2006

(65) Prior Publication Data

US 2007/0154062 A1 Jul. 5, 2007

(30) Foreign Application Priority Data

Oct. 6, 2005 (DE) ......................... 10 2005 048 134

(51) Int. Cl.
*G06K 9/00* (2006.01)

(52) U.S. Cl. ......................... 382/152; 382/154; 356/602

(58) Field of Classification Search ............... 29/407.05, 29/407.08, 559; 382/141, 152, 154
See application file for complete search history.

(56) References Cited

U.S. PATENT DOCUMENTS

| | | | | |
|---|---|---|---|---|
| 5,026,033 | A | 6/1991 | Roxy | |
| 5,285,397 | A | 2/1994 | Heier et al. | |
| 5,901,426 | A * | 5/1999 | Okazaki et al. | 29/407.08 |
| 6,101,268 | A * | 8/2000 | Gilliland | 382/152 |
| 6,289,952 | B1 * | 9/2001 | Jones et al. | 144/135.2 |
| 6,651,351 | B1 | 11/2003 | Christoph et al. | |
| 6,959,108 | B1 * | 10/2005 | Bartelt et al. | 382/141 |
| 7,324,685 | B2 * | 1/2008 | Mejias Miranda | 382/147 |
| 2002/0108239 | A1 * | 8/2002 | Isogai et al. | 29/834 |
| 2002/0134817 | A1 * | 9/2002 | Shepard | 228/105 |
| 2003/0184765 | A1 * | 10/2003 | Gurny | 356/602 |

FOREIGN PATENT DOCUMENTS

| | | | |
|---|---|---|---|
| DE | 88 00 739 | U1 | 3/1988 |
| DE | 39 36 396 | C1 | 4/1991 |
| DE | 39 41 144 | | 1/1994 |
| DE | 195 31 520 | A1 | 1/1997 |
| DE | 102 35 577 | A1 | 2/2004 |
| DE | 20 2004 008 961 | | 10/2004 |
| DE | 103 57 069 | A1 | 6/2005 |

* cited by examiner

*Primary Examiner* — Gregory M Desire
(74) *Attorney, Agent, or Firm* — Henry M. Feiereisen; Ursula B. Day

(57) ABSTRACT

Apparatus for optically surveying and/or examining a welding componentry, in particular a vehicle axle or instrument panel, includes a measuring space for accommodating a plurality of cameras for taking images of the welding componentry. The images are combined and evaluated in an evaluation unit. Disposed in the measuring space is a support unit for support of the welding componentry. The support unit includes a base plate and at least two vertically adjustable support columns on the base plate. Provided on the free end of each support column is a clamping unit which includes two clamping elements constructed for movement relative to one another for clamping the welding componentry. In addition, the support columns have each a pin which is movable in relation to the clamping unit.

10 Claims, 3 Drawing Sheets

APPARATUS AND METHOD FOR OPTICALLY SURVEYING AND/OR EXAMINING A WELDING COMPONENTRY

CROSS-REFERENCES TO RELATED APPLICATIONS

This application claims the priority of German Patent Application, Serial No. 10 2005 048 134.5, filed Oct. 6, 2005, pursuant to 35 U.S.C. 119(a)-(d), the content of which is incorporated herein by reference.

BACKGROUND OF THE INVENTION

The present invention relates to an apparatus for optically surveying and/or examining a welding componentry, in particular a vehicle axle or instrument panel. In addition, the present invention relates to a method of surveying and examining a welding componentry.

Nothing in the following discussion of the state of the art is to be construed as an admission of prior art.

Heretofore, a welding componentry, e.g. a vehicle axle or an instrument panel, manufactured on a large scale, has been examined, either attributively or through measurement, for determining whether the welding componentry is true to size. Attributive tests involve mechanical tracing gauges. This procedure is time-consuming, inflexible and oftentimes inaccurate and prone to fail. Another approach is described in U.S. Pat. Nos. 5,285,397 or 6,651,351 and involves a random surveying of a welding componentry through use of a coordinate measuring machine. This procedure requires long cycle times and thus is essentially unsuitable for application during production. Components may also be surveyed through scanning of relevant component zones by means of a light section sensor or by means of laser-optical triangulation sensors. The sensors are hereby guided by robots. This in turn incurs high costs and involves also long cycle times.

All afore-mentioned systems assume the task to survey or check complex welding componentries at certain cycle times. To attain at least a required minimum precision, it is important to properly clamp the welding componentry and to precisely configure the optical equipment. A problem encountered to date is hereby to correctly configure the mechanical clamping mechanism so as to ensure a high mechanical stability while still enabling free accessibility for optical sensors to all features being surveyed.

It would therefore be desirable and advantageous to provide an improved apparatus and method for optical surveying and/or examining a welding componentry, to obviate prior art shortcomings and to effect a high mechanical stability when the welding componentry is clamped while providing a sufficient viewing field for the sensors to realize a reliable operation.

SUMMARY OF THE INVENTION

According to one aspect of the present invention, an apparatus for optically surveying and/or examining a welding componentry, in particular a vehicle axle or an instrument panel, includes a measuring space, a plurality of cameras disposed in the measuring space for taking images of the welding componentry, an evaluation unit for evaluating the images, a support unit disposed in the measuring space for support of the welding componentry, with the support unit including a base plate and at least two support columns on the base plate, and a plurality of clamping units respectively provided on a free end of the support columns, with each clamping unit including two clamping elements constructed for movement relative to one another for point or surface clamping the welding componentry, and with at least one of the support columns having a pin movable in relation to its clamping unit.

The present invention resolves prior art problems by providing a flexible and mechanically stable clamping of a welding componentry in the measuring space. As a result, measuring accuracy is enhanced while realizing short measuring times. The respective component or component feature is measured via cameras which take images of the welding componentry from different angles. Using the computer-assisted evaluation unit, the information from each camera can be combined to provide a three-dimensional survey. The photogrammetry uses hereby the images to reconstruct and measure the spatial disposition and three-dimensional shape of the welding componentry. The survey apparatus according to the invention attains a defined clamping of the welding componentry in the measuring space. The provision of plural support columns, e.g. four or more clamping points, affords flexibility to suit a wide variety of different welding componentries, while still achieving a precise and reproducible measurement. For example, a welding componentry can be clamped in four points. Clamping in three points, with the fourth point remaining free in the space, enables a measurement of a “twist”, i.e. rotation, of a welding componentry.

According to another feature of the present invention, at least one of the support columns may be constructed for in and out movement in relation to an image detection range of the cameras. As a result, different clamping variations of the welding componentry can be simulated.

The pins on the support columns or clamping units are used to hold the welding componentry by moving into openings of the welding componentry. Suitably, each pin has two length portions of different diameter. The pins can be constructed with alignment elements for properly positioning the welding componentry. An example of an alignment element involves an element that expands or spreads to thereby adjust the position of the welding componentry. A pin may be equipped with two or three alignment elements to act in one or two independent directions.

At least one of the pins may be configured as “measuring pin” by which the absolute position of a feature of the welding componentry can be measured indirectly via the position of the measuring pin or its support unit in relation to the feature. It is also possible to directly survey or examine a particular feature, e.g. an opening in the welding componentry, by taking a snapshot of this feature.

According to another feature of the present invention, the clamping elements may have recesses to clear a view for the cameras onto a feature disposed between the clamping elements. In this way, accessibility and viewing of the feature to be measured is enhanced for the optical sensors. The clamping elements can thus be configured in such a way as to ensure free optical access to the individual feature being surveyed, even when the welding componentry is clamped.

According to another feature of the present invention, the measuring space can be designed light-proof by providing a suitable enclosure (housing). The enclosure eliminates incident light from outside so that defined light conditions can be created inside the measuring space through use of respective lightings. Defined light conditions promote measuring accuracy and thus represent a prerequisite for the quality of the measurement. Suitably, the measuring space may be pressurized by means of overpressure ventilation. An example of such overpressure ventilation involves the use of a fan with filter to produce a slight overpressure inside the measuring space so that ingress of air contaminants is prevented. This measure also contributes to an enhanced quality of the measuring or examination process.

According to another feature of the present invention, a temperature of the welding componentry may be determined. Measurement of the component temperature enables determination of offset values for the respective measurement so that a measuring result can always be related to a reference temperature or room temperature of 20° C. for example.

According to another aspect of the present invention, a method of surveying a welding componentry includes the step of taking a plurality of images of a feature of a welding componentry for directly surveying the feature of the welding componentry: Subsequently, the images can be evaluated in an evaluation unit.

According to still another aspect of the present invention, a method of surveying a welding componentry includes the steps of determining a position of a pin of a support column for support of a welding componentry in relation to a feature of the welding componentry, and indirectly surveying the feature in response to the position determination of the pin in relation to the feature.

According to yet another aspect of the present invention, a method of examining a welding componentry includes the step of taking an image of a feature of a welding componentry for directly examining the feature of the welding componentry. In this way, a pure survey can be accompanied by a complete inspection of all components of the welding componentry.

The apparatus according to the present invention allows a contactless survey of a welding componentry. The measurement equipment, i.e. cameras with necessary sensors, exposure meter and the like, are fixedly positioned in place. No moving parts of the optical surveying apparatus are required. As a consequence, the apparatus becomes robust and requires little maintenance. Wear is of no concern and trouble sources are minimized. As no moving parts are encountered for the survey, the surveying apparatus operates speedily and the method can be carried out very fast. Many images can be taken simultaneously so that the actual measuring time can be reduced to fractions of seconds. This also has a positive effect on the measuring accuracy because external impacts, e.g. vibrations, have no significant influence on the measuring result. Also possible is a parallel measurement of the component temperature which can be included in the evaluation so that the measuring result can always be related to a room temperature of 20° C. for example.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
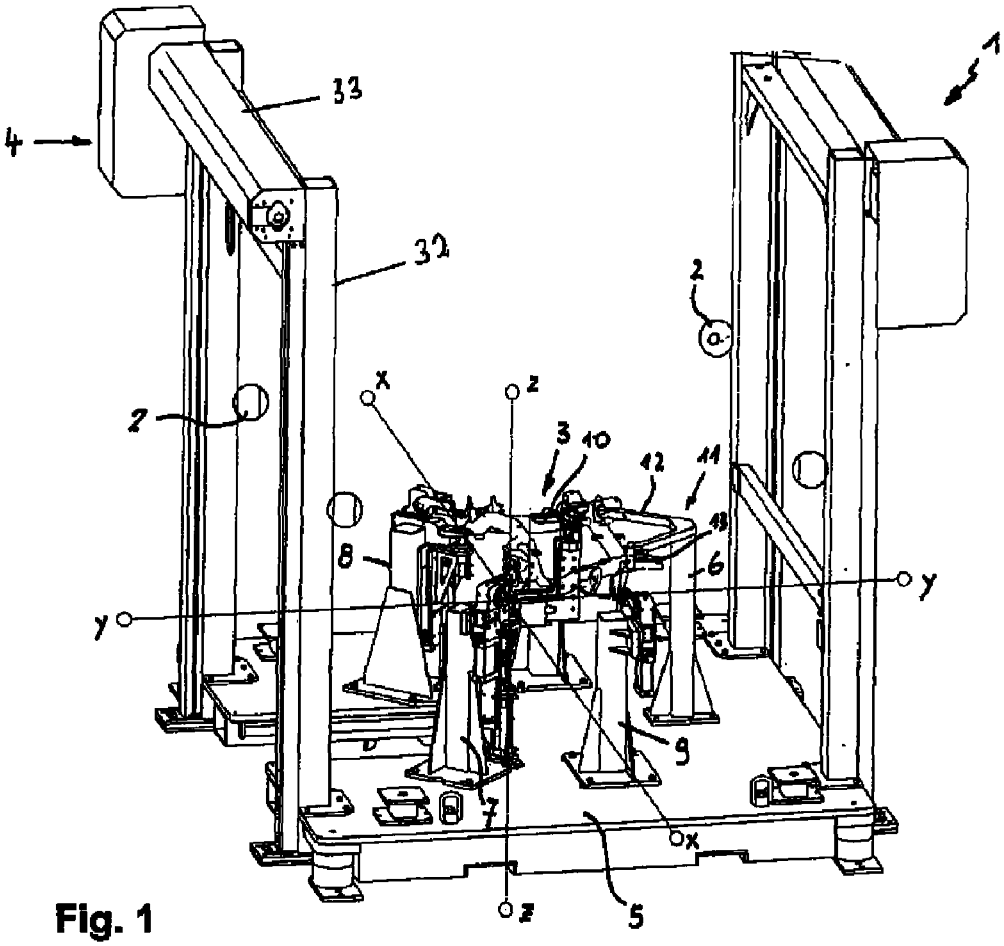
FIG. 1 is a perspective illustration of an apparatus according to the present invention, showing in detail the area of the measuring space.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 6:
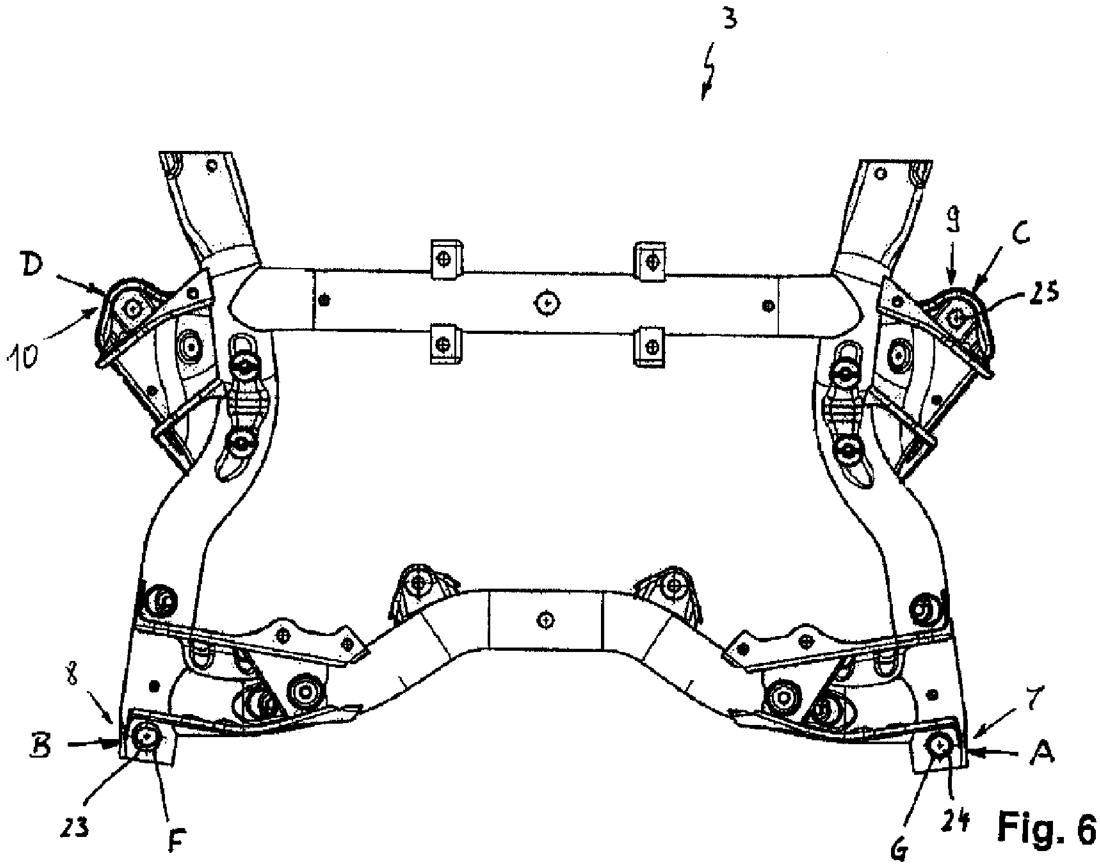
FIG. 6 is a schematic plan view of an axle support as an example of a welding componentry.

Turning now to the drawing, and in particular to FIG. 1, there is shown a perspective illustration of an apparatus according to the present invention, for optical surveying and/or examination of a welding componentry, generally designated by reference numeral 3, in particular a vehicle axle or instrument panel. X, Y, and Z designate space coordinates in FIG. 1. The apparatus includes a measuring space, also called measuring cell, generally designated by reference numeral 1, and a plurality of cameras 2 disposed in the measuring space 1 for taking images of the welding componentry 3. By way of example, the welding componentry 3, shown in FIG. 1, is represented by an axle support, as also shown in FIG. 6.

The measuring space 1 is demarcated within an enclosure or housing 4 which is shown only in parts here, without back and front walls as well as ceiling. The enclosure 4 has sidewalls in the form of a framework 32 which can be closed by a shutter 33 so that the measuring space 1 can be closed off to prevent incident light. The measuring space 1 is thus constructed light-proof. Although not shown in detail, the measuring space 1 can be pressurized by means of overpressure ventilation, e.g. fan, to prevent ingress of air contaminants.

A stable base plate 5 is accommodated in the measuring space 1 for attachment of five support columns 6, 7, 8, 9, 10 which are provided for clamping the welding componentry 3. Support columns 7, 8, 9, 10 are hereby constructed for vertical adjustment. The support column 6 has an upper end 11 formed with two cantilever arms 12. Each cantilever arm 12 has a pin 13 for engagement in an opening of the welding componentry 3. As a result of the provision of five support columns 6, 7, 8, 9, 10, a wide variety of welding componentries can be surveyed by securing the welding componentry to appropriate ones of the support columns 6, 7, 8, 9, 10.

Figure 2:
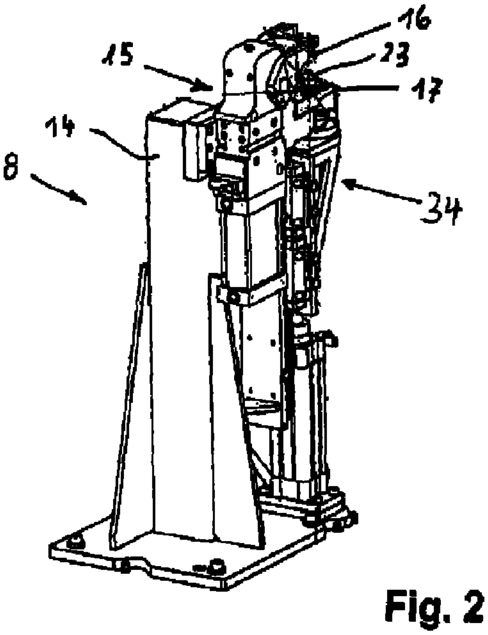
FIG. 2 is a perspective illustration of a support column of the apparatus.
Figure 3:
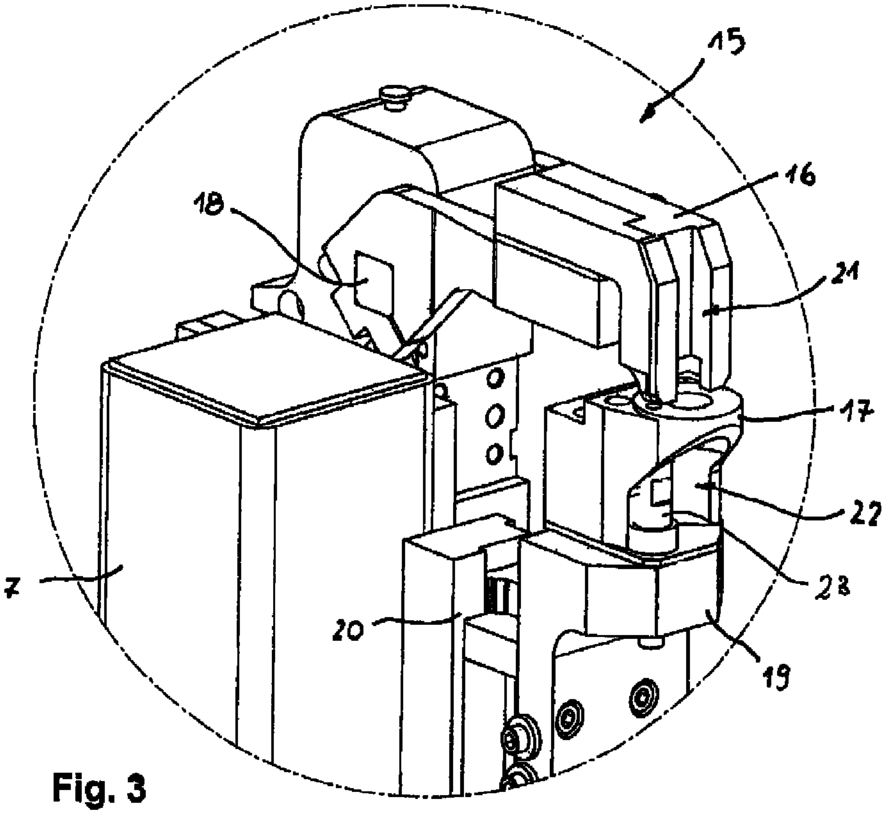
FIG. 3 is a detailed illustration, on an enlarged scale, of an upper end of a support column.
Figure 4:
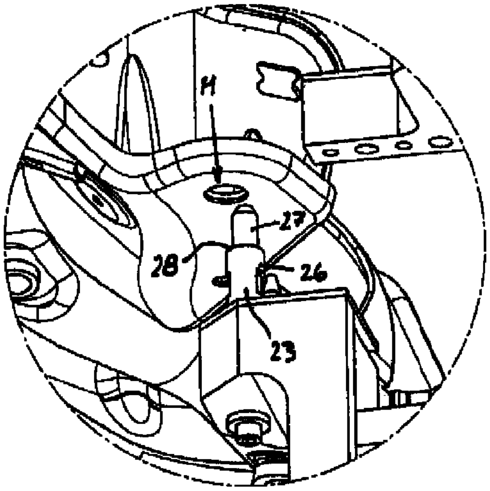
FIG. 4 is a detailed illustration, on an enlarged scale, of a pin of a support column.
Figure 5:
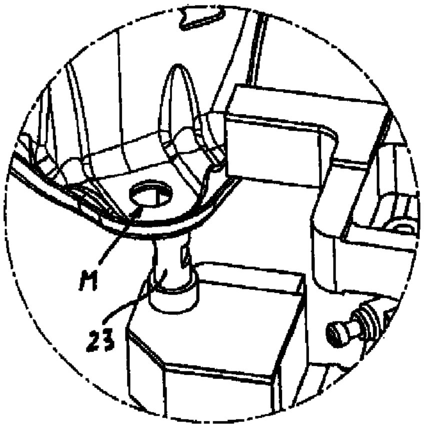
FIG. 5 is a detailed illustration of the pin from a different viewing angle.

FIG. 2 shows in greater detail the structure of the height-adjustable support columns 7, 8, 9, 10. As the support columns 7, 8, 9, 10 are of identical construction, except as otherwise noted, the following description is made only in relation to the support column 8 and is equally applicable to the support columns 7, 9, 10. The support column 8 has an upper end 14 which is provided with a clamping unit 15 having an upper clamping element 16 and a lower clamping element 17 which are movable relative to one another by a suitably height-adjustment mechanism, generally designated by reference numeral 34. As shown in particular in FIG. 3, the upper clamping element 16 is swingably mounted to the upper end 14 for rotation about a horizontal axle 18. The lower clamping element 17 is movable via a support arm 19 along a vertical guide 20. The welding componentry 3 can be clamped via the clamping elements 16, 17, e.g. at selected points A, B, C, D, as indicated in FIG. 6. The clamping element 16 is formed with a recess 21 and the clamping element 17 is formed with a recess 22 so that a viewing range of the cameras 2 is cleared to be able to focus upon a feature M (cf. FIGS. 4, 5) to be surveyed, which is placed between the clamping elements 16, 17 and may involve a hole for example. The support column 8 further includes a pin 23 which is movable in relation to the clamping unit 15 in vertical direction as well as sideways. As shown in particular in FIG. 4, the pin 23 has two length portions 26, 27 of different diameter so as to define a shoulder that forms a stop 28 or support surface for the welding componentry 3.

Figure 7:
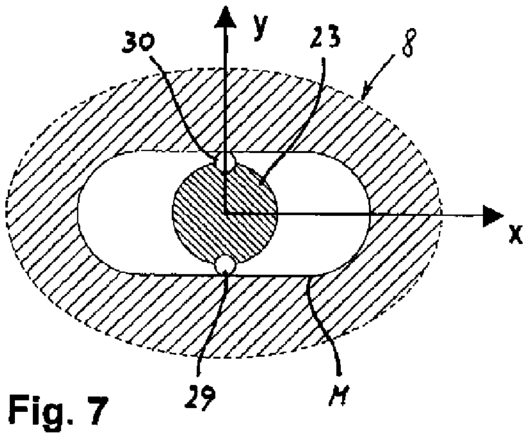
FIG. 7 is a technical schematic illustration of an area, marked F in FIG. 6.

As shown in FIG. 7, the pin 23 of support column 8 is provided with two alignment elements 29, 30 for alignment of the welding componentry 3, with the alignment elements 29, 30 acting in Y-direction so that the welding componentry can be centered by the pin 23 in Y-direction. Alignment in Z-direction is realized by the stop 28 of the pin 23.

Figure 8:
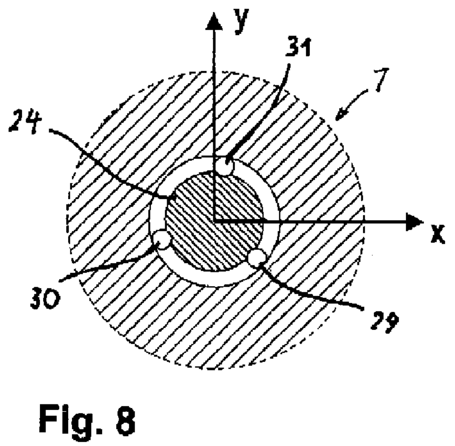
FIG. 8 is a technical schematic illustration of an area, marked G in FIG. 6.

The support columns 7 and 9 are provided with pins 24, 25, respectively. Thus, the welding componentry 3 can be aligned on the support columns 7, 8, 9, 10 in zero position. The pin 24 of the support column 7 has three alignment elements 29, 30, 31, as shown in FIG. 8, so that the welding componentry 3 can be aligned in X-direction as well as Y-direction, whereas the alignment in Z-direction is again realized by the stop 28 of the pins 24.

The welding componentry 3 is imaged by the cameras 2 from different angles. The information received from each of the cameras 2 is inputted into a computer-assisted evaluation unit (not shown) for evaluation and 3D-surveying of the welding componentry 3.

FIG. 6 shows, by way of example, a welding componentry 3 in the form of an axle support that can be selectively clamped upon four points A, B, C, D of the support columns 7, 8, 9, 10 for attaining a precise and reproducible measurement of the axle support 3. When e.g., measuring a twist of the welding componentry 3, the welding componentry 3 is clamped at the three points A, B, C only, i.e. support columns 7, 8, 9, whereas the fourth point D, support column 10, remains free in space. In this case, the support column 10 and its clamping unit 15 are suitably moved out of the image detection range of the cameras 2. Thus, while the axle support 3 is clamped in the points A, B, C (three-point support), the position of the axle support in point D can be measured to determine the twist of the axle support 3.

A direct survey of a feature M of the welding componentry 3 is carried out by taking several snapshots of the feature M with subsequent evaluation of the image information in the evaluation device. Also conceivable is an indirect survey of a feature M of the welding componentry 3 through determination of the position of the pin 23, 24 in relation to the feature M. A direct examination of a feature M of the welding componentry 3 can be realized through taking a snapshot of the feature M to be controlled.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. Apparatus for optically surveying and/or examining a welding componentry, comprising:

a measuring space;

a plurality of cameras disposed in the measuring space for taking images of the welding componentry;

an evaluation unit for evaluating the images;

a support unit disposed in the measuring space for support of the welding componentry, said support unit including a base plate and at least two support columns on the base plate; and a plurality of clamping units, each of the clamping units being provided on a free end of a corresponding one of the support columns and movable in a vertical direction relative to the base plate, whereby the clamping units and the support columns are placed into one-to-one correspondence, each clamping unit including two clamping elements constructed for movement relative to one another for clamping the welding componentry, wherein at least one of the support columns has a pin with a support surface for the welding componentry and movable in relation to the clamping unit in the vertical direction and in a sideways direction that is different from the vertical direction.

2. The apparatus of claim 1, wherein at least one of the support columns is constructed for in and out movement in relation to an image detection range of the cameras.

3. The apparatus of claim 1, wherein the pin has two length portions of different diameter.

4. The apparatus of claim 1, wherein the pin is constructed with alignment elements for correctly aligning the welding componentry in at least one other direction that is different from the vertical direction.

5. The apparatus of claim 1, wherein the clamping elements have recesses to clear a view for the cameras onto a feature disposed between the clamping elements.

6. The apparatus of claim 1, wherein the measuring space is light-proof.

7. The apparatus of claim 1, wherein the measuring space includes an overpressure ventilation for pressurizing the measuring space.

8. The apparatus of claim 1, further comprising means for determining a temperature of the welding componentry.

9. A method of surveying a welding componentry, comprising the steps of:

clamping the welding componentry in a clamping unit including two clamping elements constructed for movement relative to one another, with a pin having a support surface for the welding componentry and being movable vertically and sideways in relation to at least one of the clamping units, determining a vertical and sideways position of the pin in relation to a feature of the welding componentry;

imaging the welding componentry with one or more cameras from different angles; and processing information about the feature received from the one or more cameras in response to the position determination of the pin in relation to the feature with a computer-assisted evaluation unit for evaluation and 3D-surveying of the welding componentry.

10. The method of claim 9, further comprising the step of taking an image of the feature of a welding componentry for directly examining the feature of the welding componentry.

* * * * *